United States Patent [19]
Bisseker

[11] Patent Number: 5,919,359
[45] Date of Patent: Jul. 6, 1999

[54] PORTABLE POOL SKIMMER

[76] Inventor: Robin Bisseker, 1495 W. Severs Rd., LaPorte, Ind. 46350

[21] Appl. No.: 08/967,402

[22] Filed: Nov. 11, 1997

[51] Int. Cl.[6] .................................................. B01D 35/05
[52] U.S. Cl. .......................... 210/169; 210/416.2; 4/492; 4/490
[58] Field of Search ................................ 210/169, 242.1, 210/416.2, 776, 490, 492; 15/1.7

[56] References Cited

U.S. PATENT DOCUMENTS

| | | | |
|---|---|---|---|
| 3,063,077 | 11/1962 | Pansini ........................................ | 15/1.7 |
| 3,860,518 | 1/1975 | Henricksen ............................. | 210/242 |
| 4,053,412 | 10/1977 | Stix ........................................ | 210/169 |
| 4,059,526 | 11/1977 | Middelbeek ............................. | 210/242 |
| 4,089,074 | 5/1978 | Sermons ..................................... | 4/172 |
| 4,105,557 | 8/1978 | Weatherholt .......................... | 210/242.1 |
| 4,305,830 | 12/1981 | Shimura .................................. | 210/801 |
| 4,746,424 | 5/1988 | Drew ....................................... | 210/169 |
| 4,889,622 | 12/1989 | Newcombe-Bond ................... | 210/169 |
| 4,994,178 | 2/1991 | Brooks .................................... | 210/169 |
| 5,143,605 | 9/1992 | Masciarelli ............................. | 210/169 |
| 5,264,122 | 11/1993 | Lakotish ............................... | 210/416.2 |
| 5,275,721 | 1/1994 | Mathews ................................. | 210/169 |
| 5,279,728 | 1/1994 | Weiss ..................................... | 210/169 |
| 5,350,508 | 9/1994 | Van der Watt .......................... | 210/169 |
| 5,454,940 | 10/1995 | Lakotish .................................... | 21/169 |
| 5,536,397 | 7/1996 | D'Offay .................................. | 210/169 |

FOREIGN PATENT DOCUMENTS 590252  1/1960  Canada ................................... 210/169

*Primary Examiner*—Jay H. Woo
*Assistant Examiner*—Robert Hopkins
*Attorney, Agent, or Firm*—Taylor & Associates, P.C.

[57] ABSTRACT

A skimmer assembly is used in a swimming pool having a water surface, a return inlet and a wall. The skimmer assembly includes an elongate container defining a channel therein. The container has a first side opposing a second side. The first side defines a substantially horizontally oriented, elongate cutout therein. The cutout is in communication with the channel and is configured for communication with the water surface. The cutout has an upper edge and a lower edge. The container has a substantially open first longitudinal end and a substantially closed second longitudinal end with a nozzle disposed therethrough. The nozzle is aligned substantially parallel with the channel and has an opposing inlet and outlet. The outlet of the nozzle tapers toward and is in communication with the channel. A porous trap having an open mouth is connected to the open first end of the container. An elongate hose is disposed outside the container and is connected with the inlet of the nozzle. A device maintains the upper edge of the cutout above the water surface and the lower edge of the cutout substantially below the water surface.

20 Claims, 5 Drawing Sheets

PORTABLE POOL SKIMMER

BACKGROUND OF THE INVENTION

1. Field of the Invention

The present invention relates to swimming pool cleaning devices, and, more particularly, devices for skimming the surface of the pool water.

2. Description of the Related Art

Debris, such as leaves or insects, tend to collect on the surface of swimming pool water. It is important to remove such floating debris, both for aesthetic reasons and to prevent microscopic organisms, such as mold, from growing in the pool water.

It is known to provide a swimming pool with a built-in skimmer on which a vacuum is drawn by the pump of the swimming pool's water recirculation system. A problem is that the water level must be maintained within a relatively narrow range so that surface water can enter into an area above the skimmer. Thus, water must be periodically added or removed from the swimming pool to maintain the water level at the level necessary for skimming. Another problem is that swimming pools are typically provided with only one skimmer. Automatic vacuuming devices are now in common use which clean the walls and floor of a swimming pool. Such automatic vacuuming devices require usage of the single swimming pool skimmer as the source of vacuum.

It is also known to use a hose connected to the swimming pool return inlet to project a submersed stream of water toward the open mouth of a net. The stream of water directs debris within the water into the net. A problem is that debris must first pass through the gap between the hose and the net before the flow of pressurized water can carry the debris into the net. The distance between the hose and the net can be lengthened in order to increase the amount of debris passing therebetween. However, an increased gap between the hose and the net also allows the flow of pressurized water to be dispersed therebetween and to lose intensity. This loss of intensity lessens the ability of the water flow to force debris into the net.

What is needed in the art is a portable swimming pool skimming device, connectable to a source of pressurized water, which is capable of maintaining intensity of water flow over a substantial distance such that surface debris may be directed into a collecting device.

SUMMARY OF THE INVENTION

The present invention provides a swimming pool skimming device including an elongate tube having one end connected to a source of pressurized water, the other end connected to a mesh bag, and a side cutout allowing surface debris to be drawn into the flow which is maintained within the tube and which directs the debris into the bag.

The invention comprises, in one form thereof, a skimmer assembly used in a swimming pool having a water surface, a return inlet and a wall. The skimmer assembly includes an elongate container defining a channel therein. The container has a first side opposing a second side. The first side defines a substantially horizontally oriented, elongate cutout therein. The cutout is in communication with the channel and is configured for communication with the water surface. The cutout has an upper edge and a lower edge. The container has a substantially open first longitudinal end and a substantially closed second longitudinal end with a nozzle disposed therethrough. The nozzle is aligned substantially parallel with the channel and has an opposing inlet and outlet. The outlet of the nozzle tapers toward and is in communication with the channel. A porous trap having an open mouth is connected to the open first end of the container. An elongate hose is disposed outside the container and is connected with the inlet of the nozzle. A device maintains the upper edge of the cutout above the water surface and the lower edge of the cutout substantially below the water surface.

An advantage of the present invention is that a flow of water is sustained over a substantial distance near the surface of the water, maximizing the amount of debris which is drawn into the flow and deposited into the bag.

Another advantage is that pressurized water is supplied through a tapering nozzle, creating a venturi which more effectively draws surface debris into the water flow within the tube.

Yet another advantage is that the built-in swimming pool skimmer can be dedicated to providing a vacuum to an automatic floor and wall cleaning device.

A further advantage is that the level of the water surface within the swimming pool does not need to be maintained within any certain range for skimming to occur.

BRIEF DESCRIPTION OF THE DRAWINGS

The above-mentioned and other features and advantages of this invention, and the manner of attaining them, will become more apparent and the invention will be better understood by reference to the following descriptions of embodiments of the invention taken in conjunction with the accompanying drawings, wherein:

FIG. 3 is a rear view of the tube of the pool skimmer of FIG. 1;

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
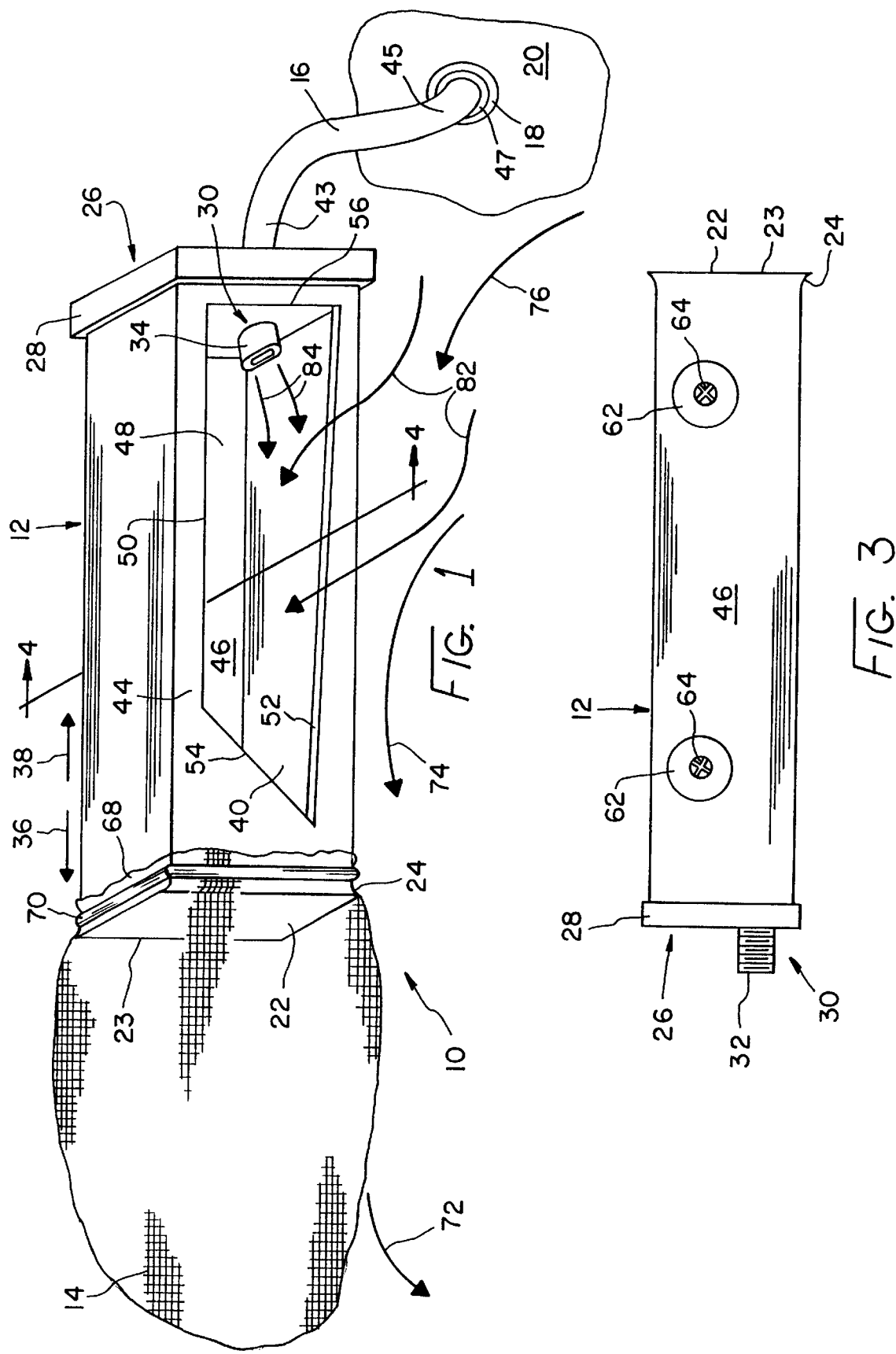
FIG. 1 is a perspective view of one embodiment of a pool skimmer of the present invention.

Referring now to the drawings, and more particularly to FIG. 1, there is shown an embodiment of a pool skimmer 10 of the present invention including an elongate container or tube 12, a mesh bag 14, and a hose 16 connected to a return inlet 18 of a pool wall 20.

Figure 2:
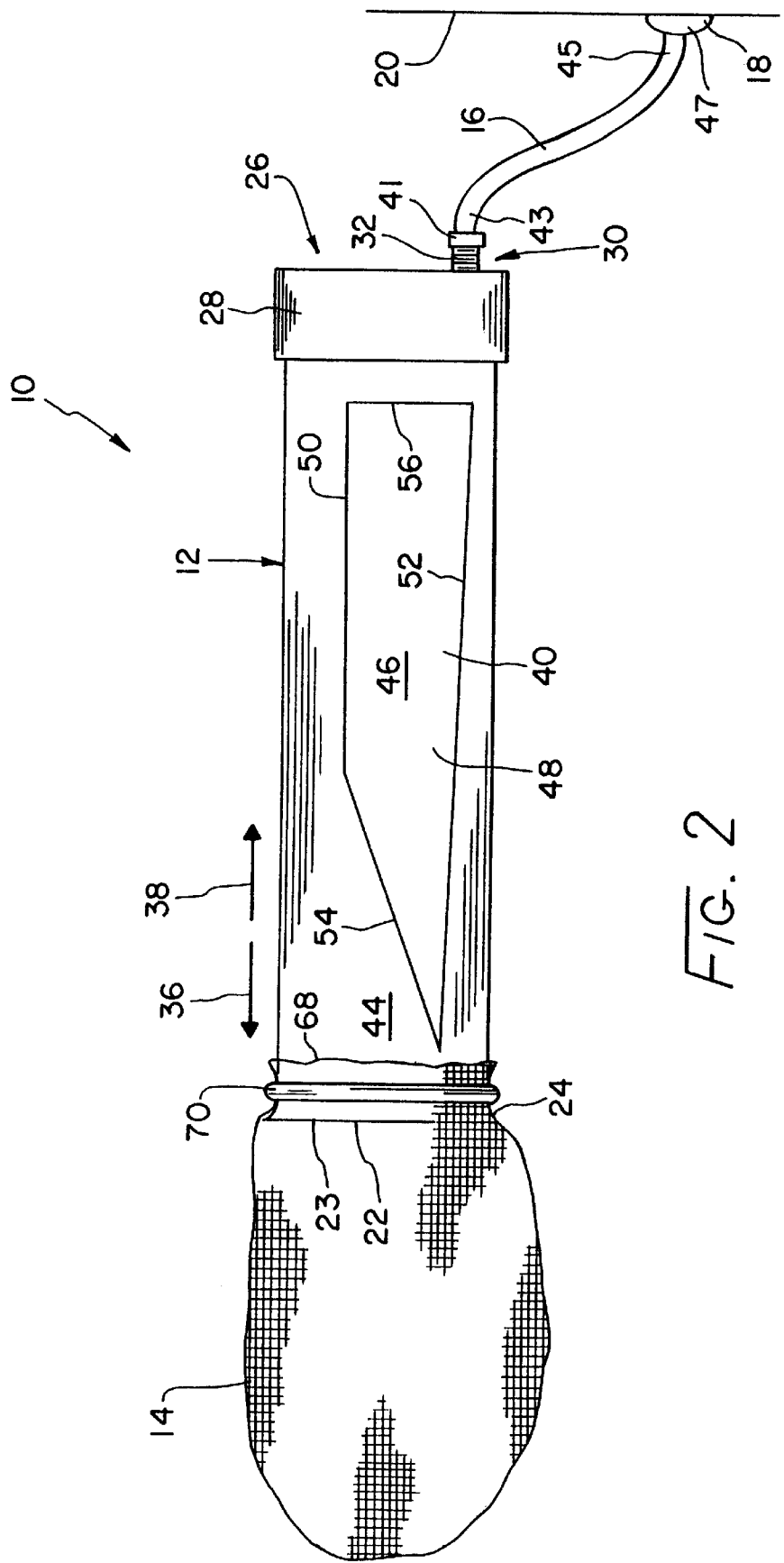
FIG. 2 is a front view of the pool skimmer of FIG. 1.
Figure 4:
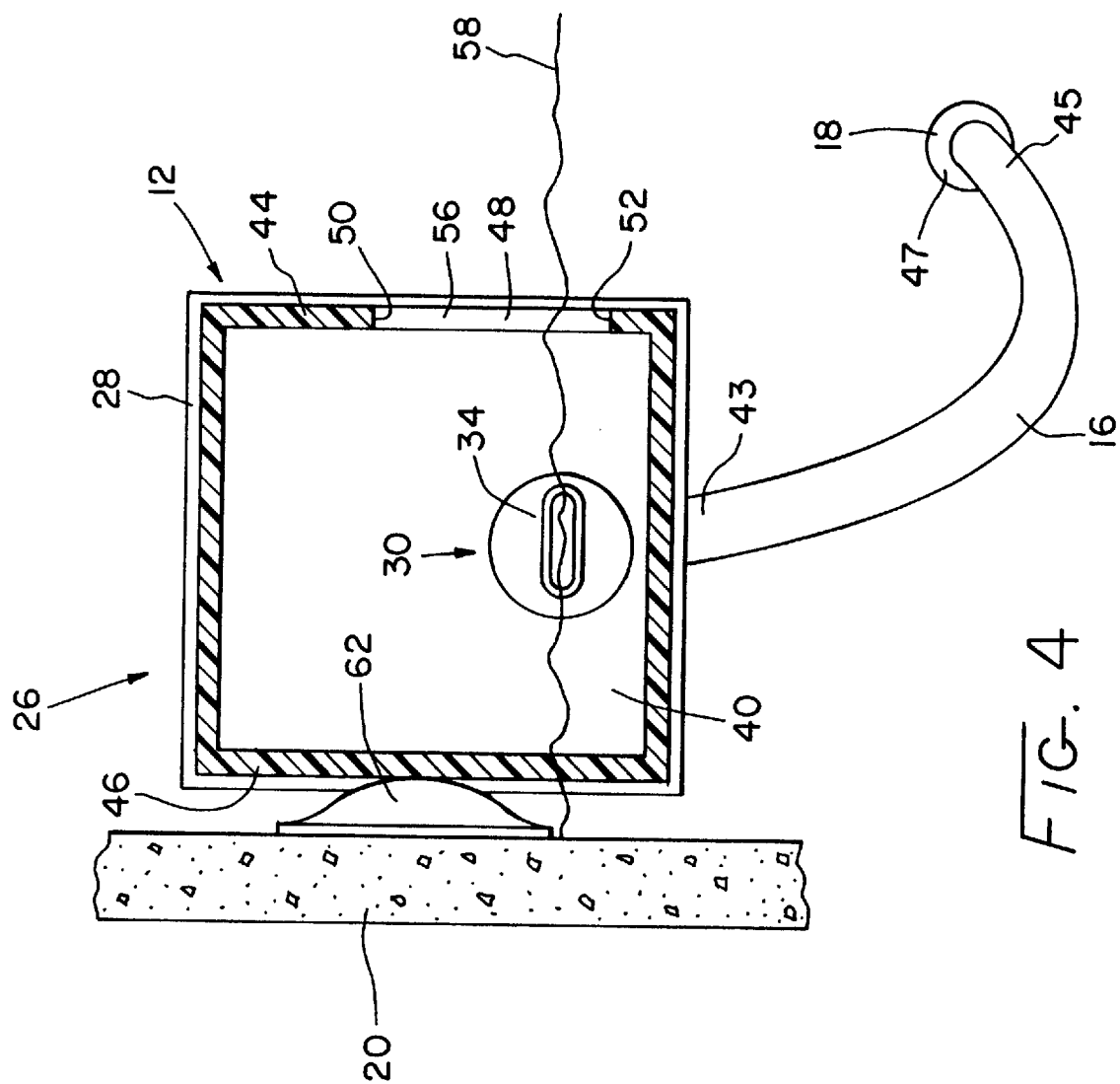
FIG. 4 is a sectional view taken along the line 4—4 in FIG. 1.

Tube 12 includes an open first longitudinal end 22 having an outwardly extending flange 24 along its perimeter 23. Tube 12 also includes an opposing substantially closed longitudinal end 26 having a detachable end cap 28. End cap 28 includes a nozzle 30 which may be either integrally formed within end cap 28 or detachable from end cap 28. Nozzle 30 has an inlet 32 (FIG. 2) and an outlet 34 substantially aligned with the longitudinal direction of tube 12 as indicated by directional arrows 36 and 38. Outlet 34 of nozzle 30 is in communication with an open channel 40 within tube 12. Outlet 34 of nozzle 30 tapers as it approaches channel 40 of tube 12. Thus, nozzle 30 provides a progressively smaller passageway through which water may flow, creating a venturi. Outlet 34 of nozzle 30 also has an oblong-shape, best seen in FIG. 4, extending substantially parallel to water surface 58.

Inlet 32 of nozzle 30 is threaded for connection to a threaded connector 41 of an elongate, flexible hose 16. Hose 16 has a first end 43 including threaded connector 41 and a second end 45 including a similar threaded connector 47. It is to be understood, however, that nozzle 30 and connector 41, as well as connector 47, can have other mating configurations other than threads.

Tube 12 has a first side 44 opposing a second side 46. First side 44 defines therein a substantially horizontally oriented, elongate cutout 48 having an upper edge 50, a lower edge 52, a first side edge 54 and a second side edge 56. Upper edge 50 is substantially horizontally oriented, substantially parallel to surface 58 of the water in the swimming pool. With this orientation, slot 48 can be in communication with both channel 40 of tube 12 and with water surface 58. Upper edge 50 and lower edge 52 are substantially greater in length than side edges 54 and 56, maximizing the amount of surface water 58 which can pass through slot 48. Lower edge 52 slants slightly upward from second side edge 56 toward first side edge 54, adjacent open first longitudinal end 22. In the embodiment shown, lower edge 52 slants upward approximately 1 inch between second side edge 56 and first side edge 54. This slight upward slant allows the skimmer to operate without adjustment over a wide range of water levels in the swimming pool. The slant also prevents floating debris from being pushed back out of channel 40 through the end of cutout 48 near first side edge 54. First side edge 54 slants sharply downward from upper edge 50 toward lower edge 52 at an approximately 45° angle toward first longitudinal end 22. This sharp slant prevents water and associated debris from bubbling up and out of channel 40 through cutout 48 near open end 22. In the embodiment shown, tube 12 is approximately eighteen inches long and has a substantially rectangular cross section. Tube 12 is shown as having a substantially square cross section, best seen in FIG. 4, measuring approximately 2½ inches on a side. Of course it is also possible for tube 12 to have other dimensions. In another embodiment (not shown), first side edge 54 is substantially vertically disposed and is not slanted.

Connection devices in the form of suction cups 62 (FIGS. 3 and 4) interconnect tube 12 with swimming pool wall 20. A pair of suction cups 62 are rigidly attached to the outside surface of second side 46 of tube 12. Suction cups 62 adhere to wall 20 in a known manner when wall 20 is smooth such as, e.g., a vinyl, plastic, fiberglass or metal pool wall. Screws 64, which can be formed of stainless steel, are used to attach suction cups 62 to a tube 12, but other varieties of attachment devices can be used as well. Suction cups 62 must be positioned on pool wall 20 such that upper edge 50 is above water surface 58 and lower edge 52 is at least mostly below water surface 58 so that surface water may enter channel 40 through slot 48. It is also possible to use more than two suction cups for added stability. If the pool wall has a rough surface, such as formed by concrete, it may not be possible to adhere suction cups 62 to the pool wall. In another embodiment (not shown), a bracket interconnects and is screwed or otherwise rigidly attached to both the pool wall and tube 12. It is to be understood that other devices such as floats and/or weights can be used to maintain water surface 58 between upper edge 50 and lower edge 52.

A porous trap in the form of a mesh bag 14 having an open mouth 68 is connected to open end 22 of tube 12 such that open mouth 68 overlaps flange 24 of end 22. An elastic band 70 holds open mouth 68 in place over open end 22. Flange 24 retains elastic band 70, keeping elastic band 70 from slipping off of open end 22. Mesh bag 14 has a mesh which is sized to capture debris which enters therein from water surface 58 but which lets water pass through. It is also possible for a plastic clip or other bag holding device to be used in place of elastic band 70.

In use, second end 45 of hose 16 is connected to a source of pressurized water, such as return inlet 18 of the swimming pool. Water flows from return inlet 18 through hose 16, and increases in flow speed as it passes through the venturi provided by the tapered outlet 34 of nozzle 30. The water then flows through channel 40 of tube 12, exits tube 12 through open end 22, and passes through mesh bag 14. In addition to the water provided by outlet 34 of nozzle 30, water also flows into channel 40 through slot 48, as indicated by arrows 82. Tube 12 is oriented such that the flow of water exiting net 14, as indicated by arrow 72, in conjunction with all of the walls of the pool, of which only wall 20 is shown, creates a counter-clockwise flow on the surface 58 of the pool water, as indicated generally by arrows 74 and 76. Other return inlets (not shown) of the pool, similar to return inlet 18, can also be used to create a counter-clockwise flow on surface 58 of the pool water. This counter-clockwise circulation carries surface water and debris such as leaves and insects into channel 40 through slot 48.

Once within channel 40, the flow of water provided through hose 16, as indicated by arrows 84, quickly pushes the debris through longitudinal end 22 and into mesh bag 14. Debris is retained within bag 14 until bag 14 can be removed from tube 12 and the debris disposed of. Further, the venturi provided by the tapered outlet 34 of nozzle 30 serves to draw surface water through slot 48 and into the flow of water in channel 40. The venturi provides a relatively high velocity flow through tube 12 which pulls surrounding water through slot 48 and into the fast moving flow within tube 12. The horizontally-oblong shape of outlet 34 maximizes the flow of water at surface 58 when outlet 34 is placed at that level. Suction cups 62 can be positioned and repositioned on wall 20 to maintain outlet 34 near the level of water surface 58. The slight upward slant of lower edge 52 of slot 48 allows tube 12 to operate while remaining stationary over an approximately two inch range of water levels in the pool. The slight upward slant also prevents debris from being pushed out of tube 12 as it approaches open end 22. The end of lower edge 52 adjacent closed end 26 can be maintained well below water surface 58 while the end of lower edge 52 adjacent open end 22 can be maintained slightly above water surface 58 in order to fully enable the upward slant of lower edge 52 to retain floating debris within tube 12. The angle of first side edge 54 prevents water from bubbling out of channel 40 through slot 48 near end 22. Such bubbling water would carry debris back out through slot, 48 along with it. Tube 12 serves to retain the flow of water and maintain the intensity of the flow without dispersion over a substantial length. Since water flow intensity is maintained, slot 48 can be of a substantial length and the gap between nozzle 30 and bag 14, through which surface water and debris passes, may be maximized. This, in turn, maximizes the amount of surface water and debris mixing with the water flow from nozzle 30 and deposited in mesh bag 14. Without tube 12, the water flow would lose its intensity and become dispersed between nozzle 30 and mesh bag 14. Thus, the water flow would not be able to effectively direct debris into mesh bag 14. In the absence of tube 12, mesh bag 14 would have to be positioned much closer to nozzle 30 in order to receive the fluid flow therefrom. Such a reduction in the gap between nozzle 30 and mesh bag 14 would also reduce the amount of surface water and debris that could find its way into the flow of water from nozzle 30 and be pushed into mesh bag 14. In another embodiment (not shown), slot 48 is placed in second side 46 instead of first side 44. This configuration is suited for use in a swimming pool having a clockwise circulation of surface water instead of a counter-clockwise circulation.

Figure 5:
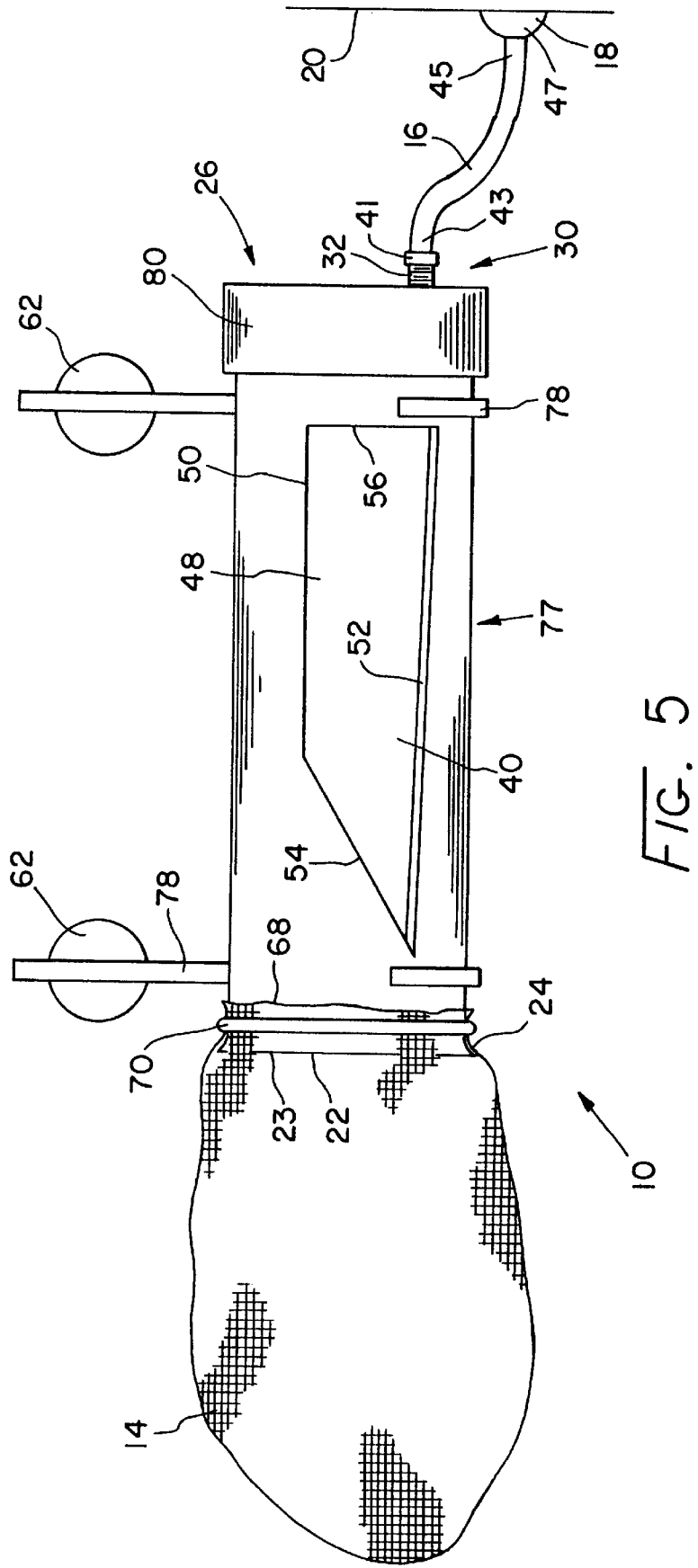
FIG. 5 is a front view of another embodiment of a pool skimmer of the present invention.
Figure 6:
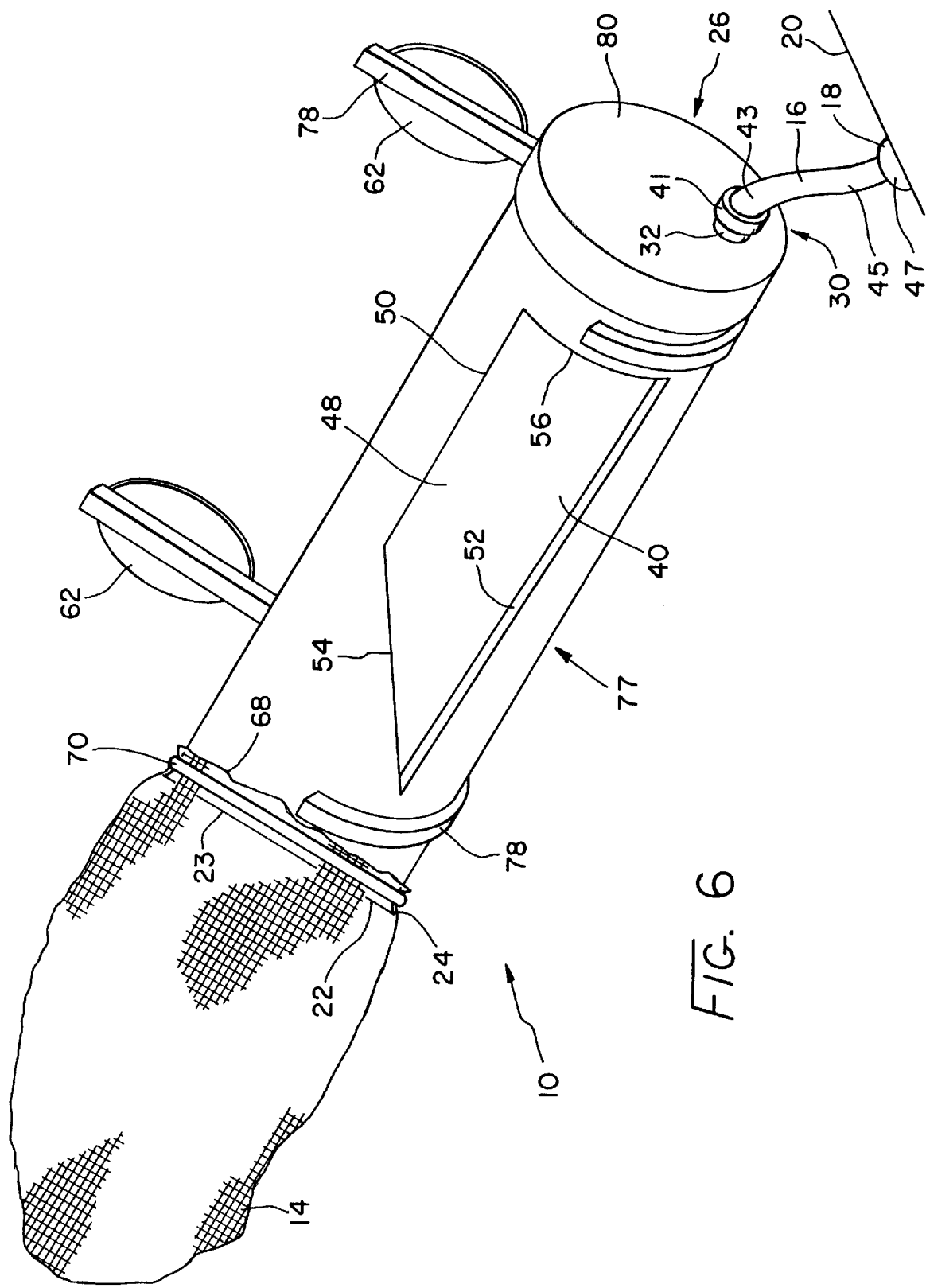
FIG. 6 is a perspective view of the pool skimmer of FIG. 5.

In yet another embodiment (FIGS. 5 and 6), a tube 77 has a circular cross section rather than a square cross section. Rather than having suction cups attached to tube 77, a pair of J-hooks 77 support tube 12 at each end. Suction cups 62 are screwed into the backs of J-hooks 78 and are adhered to pool wall 20. It is possible to adjust the level of nozzle 30 relative to surface water 58 by rotating a circular, detachable end cap 80 relative to the rest of tube 77. In a further embodiment (not shown), the end cap may include a slot or track and nozzle 30 may be carried by and movable along the length of the track such that the level of nozzle 30 relative to water surface 58 can be adjusted.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. In a swimming pool having a water surface, a return inlet and a wall, a skimmer assembly comprising:

an elongate container defining a channel therein, said container having a first side opposing a second side, said first side having a substantially horizontally oriented, elongate cutout therein, said cutout being in communication with said channel and configured for communication with the water surface, said cutout having an upper edge and a lower edge, said container having a substantially open first longitudinal end and a substantially closed second longitudinal end with a nozzle disposed therethrough, said nozzle aligned substantially parallel with said channel, said nozzle having an opposing inlet and outlet, said outlet of said nozzle tapering toward and in communication with said channel, each of said first side and said second side being disposed between said first longitudinal end and said second longitudinal end of said container;

a porous trap having an open mouth connected to said open first end of said container;

an elongate hose having a first end connected with said inlet of said nozzle and a second end connectable with the return inlet of the swimming pool; and means for maintaining said upper edge of said cutout above the water surface and said lower edge of said cutout substantially below the water surface.

2. The skimmer assembly of claim 1, wherein said lower edge slants upward toward said open first longitudinal end.

3. The skimmer assembly of claim 1, wherein said cutout includes two opposing side edges joining said upper edge and said lower edge, a first of said two side edges being adjacent said open first longitudinal end, said first side edge slanting downward toward said open first longitudinal end.

4. The skimmer assembly of claim 1, wherein said outlet of said nozzle has a horizontally oblong opening configured for communication with the water surface.

5. The skimmer assembly of claim 1, wherein said outlet of said nozzle is configured to direct water toward said first longitudinal end and along the water surface within said container.

6. The skimmer assembly of claim 1, wherein said nozzle is detachable from said second longitudinal end.

7. The skimmer assembly of claim 1, wherein said substantially closed second longitudinal end includes a detachable end cap.

8. The skimmer assembly of claim 1, wherein said container is substantially rectangular in cross section.

9. The skimmer assembly of claim 8, wherein said maintaining means comprises at least one suction cup connected to said container, said at least one suction cup configured for adhering to the wall of the swimming pool.

10. The skimmer assembly of claim 9 wherein said at least one suction cup is rigidly attached to said second side of said container.

11. The skimmer assembly of claim 1, wherein said container is substantially circular in cross section.

12. The skimmer assembly of claim 11, wherein said maintaining means comprises at least one J-hook connected to the wall of the swimming pool and carrying said container.

13. The skimmer assembly of claim 12, further comprising at least one suction cup rigidly attached to said at least one J-hook and configured for adhering to the wall of the swimming pool.

14. The skimmer assembly of claim 11, wherein said nozzle of said substantially closed second longitudinal end is carried by a detachable end cap, said end cap being rotatable relative to said cutout for adjustment of a level of said nozzle relative to the water surface.

15. The skimmer assembly of claim 1, wherein said porous trap comprises a mesh bag.

16. In a swimming pool having a water surface, a return inlet and a wall, a skimmer assembly comprising:

an elongate container defining a channel therein, said container having a first side opposing a second side, said first side having a substantially horizontally oriented, elongate cutout therein, said cutout being in communication with said channel and configured for communication with the water surface, said cutout having an upper edge and a lower edge, said container having a substantially open first longitudinal end and a substantially closed second longitudinal end with a nozzle disposed therethrough, said nozzle aligned substantially parallel with said channel, said nozzle having an opposing inlet and outlet, said outlet of said nozzle tapering toward and in communication with said channel;

a porous tray having an open mouth receiving said open first end of said container;

an elongate hose having a first end connected with said inlet of said nozzle and a second end connectable with the return inlet of the swimming pool; and means for maintaining said upper edge of said cutout above the water surface and said lower edge of said cutout substantially below the water surface.

17. The skimmer assembly of claim 16, further comprising means for retaining said open first longitudinal end within said open mouth of said porous trap.

18. The skimmer assembly of claim 17, wherein said retaining means comprises an elastic band around said open mouth of said porous trap.

19. The skimmer assembly of claim 18, wherein said open first longitudinal end includes a perimeter having an outwardly extending flange configured for retaining said elastic band.

20. In a swimming pool having a water surface, a return inlet and a wall, a skimmer assembly comprising:

an elongate container defining a channel therein, said container having a length and a first side opposing a second side, said first side having a substantially horizontally oriented, elongate cutout therein, said cutout extending substantially across said length of said container, said cutout being in communication with said channel and configured for communication with the water, surface, said cutout having an upper edge and a lower edge, said container having a substantially open first longitudinal end and a substantially closed second longitudinal end with a nozzle disposed therethrough, said nozzle aligned substantially parallel with said channel, said nozzle having an opposing inlet and outlet, said outlet of said nozzle tapering toward and in communication with said channel;

a porous trap having an open mouth connected to said open first end of said container;

an elongate hose having a first end connected with said inlet of said nozzle and a second end connectable with the return inlet of the swimming pool; and a connecting device interconnecting said container with the wall of the pool.

* * * * *